B. B. BROSVIK.
TIRE SECURING DEVICE.
APPLICATION FILED JUNE 28, 1916.
1,235,546.
Patented Aug. 7, 1917.
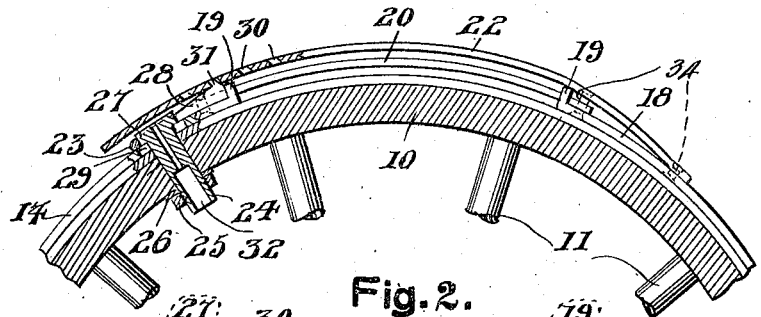
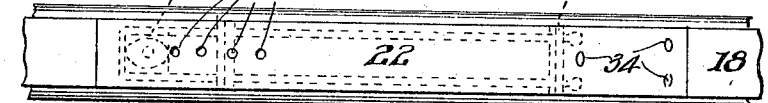
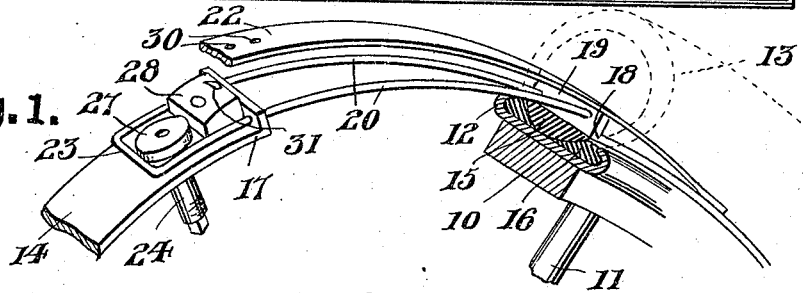
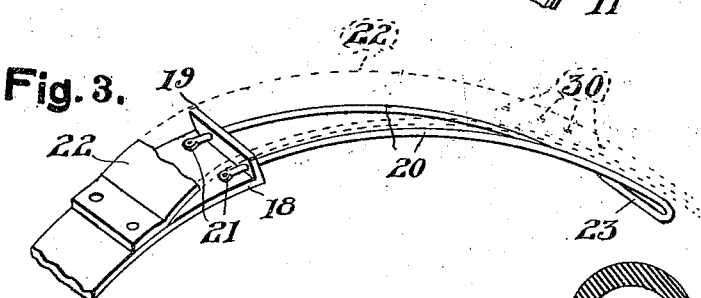
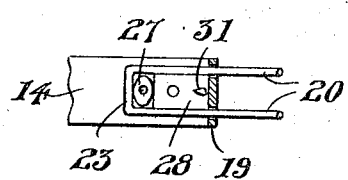
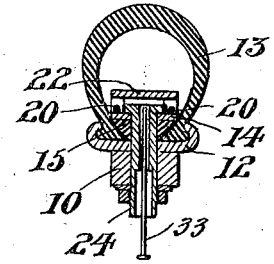
Inventor
Bertel B. Brosvik
By
Attorney

UNITED STATES PATENT OFFICE.

BERTEL B. BROSVIK, OF DULUTH, MINNESOTA.

TIRE-SECURING DEVICE.

1,235,546.   Specification of Letters Patent.   Patented Aug. 7, 1917.

Application filed June 28, 1916. Serial No. 106,411.

*To all whom it may concern:*

Be it known that BERTEL B. BROSVIK, a citizen of the United States of America, residing at 16 Highland Ave., Duluth, in the county of St. Louis and State of Minnesota, has invented certain new and useful Improvements in Tire-Securing Devices, of which the following is a specification.

This invention relates to certain new and useful improvements in tire securing devices for automobile wheels.

The primary object of the invention is the provision of a ready means of great strength for locking a tire shoe securely to a rim for preventing its removal during any possible excessive traffic conditions.

A further object of the device is to provide a tire casing securing means especially adapted for use with resilient inserts or cushioning members taking the place of the usual cushion or inner pneumatic tube, the device being such that the shoe is operatively clamped to the rim by means operable adjacent the felly of the wheel which when locked prevents the removal of the shoe until the device is released.

In the drawings forming a part of this application like reference numerals refer to corresponding parts throughout the several views.

Figure 1 is a perspective view of the present device partially broken away and illustrating the same in operative position upon a wheel structure, a portion of a tire being shown by dotted lines.

Fig. 2 is a top plan view thereof with the casing removed.

Fig. 3 is a view of one end portion of the locking device with the tongue member thereof illustrated by dotted lines.

Fig. 4 is a transverse radial section through the wheel member and device.

Fig. 5 is a top plan view of the opposite end member of the device from that shown in Fig. 3, and, Fig. 6 is a central sectional view of the device illustrated in its locked position upon a felly and rim designed for an outer casing for the tire of slightly different edge bead mounting form.

It being understood that the present device is designed for locking any form of outer tire shoe or casing to a rim, the same is illustrated herein in Fig. 1 as employed in connection with a wheel having a felly 10, spokes 11, a clencher rim 12 and a tire shoe or casing 13 secured to the said rim by means of the present device, positioned within the shoe.

A split metallic ring or strip 14 is arranged within the shoe 13 seated upon an annular cushion 15 of rubber or any desirable flexible material arranged inwardly in contact with the base flanges 16 of the said shoe.

The free opposite ends 17 and 18 of the ring 14 are provided with upturned strengthening flanges 19 through which a wire yoke or U-shaped connecting member 20 extends. The free ends of the connector 20 are secured as at 21 to the ring end 18 inwardly of the adjacent angular flange 19 thereof while a resilient tongue 22 is carried by the said end 18 overlying and of greater length than the connector 20 being secured to said end by rivets 34 while the closed end 23 of the connector 20 is slidably mounted upon the opposite end 17 of the ring 14 spaced from the flange 19 of said end.

A tubular spindle or shaft 24 is radially positioned journaled through the felly 10, rim 12 and ring 14 having a stop nut 25 upon its outer end adjacent the said felly while a washer 26 is preferably interposed between the said nut and felly. A cam head 27 is provided upon the inner end of the shaft 24 arranged spaced from the adjacent flange 19 of the ring end 17 while a substantially rectangular block 28 is arranged upon the said ring end in contact with the terminal flange 19 thereof and between the said flange and cam head 27.

The head 27 being positioned between the connector end 23 and the block 28 is adapted to engage the said end and block for forcing the same apart upon turning the shaft 24, it being understood that the ring end 17 is provided with a slot 29 through which the shaft 24 extends for allowing the relative shifting of the adjacent ends 17 and 18 of the locking ring 14.

The tongue 22 is provided with a plurality of inclined perforations or keeper openings 30 adapted to receive a locking hood 31 projecting angularly from the upper face of the block 28. The cam 27 is positioned transversely of the ring 14 as illustrated in Fig. 5 before the shoe is locked upon the rim, it being understood that any form of cushioning member is arranged within the shoe 13 bearing upon the tongue 22 which forces the latter against the block 28 for engaging the hook 31 with the perforation 30 brought into registry therewith. The outer end of the shaft 24 is preferably squared and upon being turned rotarily draws the ring ends 17 and 18 together until the head 27 is positioned as illustrated in Fig. 1 of the drawing, it being understood that the hook 31 engages within succeeding ones of said keeper openings 30 which retains the tongue 22 thereon and locks the ring 14 in its annular arrangement, such locking position of the elements being illustrated in Fig. 6 of the drawing. This tightening of the ring 14 draws the cushion member 15 and the ring 14 in close seating engagement with the base beads 16 of the shoe 13 thereby locking the said beads into the rim 12 so that the shoe 13 cannot be removed until the ring 14 is loosened without tearing or separating the body of the shoe member itself. The device is shown in Fig. 6 mounted with the ring 14 engaging directly upon the rim 12, the cushion 15 being omitted and especially adapted for use where the base flanges of the shoe are slightly separated when in the retained positions upon the rim, it being understood that the locking device with all of its elements is identical. The shaft 24 has a central bore 32 adapted to receive an instrument such as a rod 33 shown in Fig. 4 for engaging the tongue 22 for releasing the same from the hook 31.

While the form of the invention herein shown and described is what is believed to be preferable, it will be understood that minor changes may be made therein without departing from the spirit and scope of the invention as claimed.

What I claim as new is:—

1. A tire securing means comprising a split ring having angular end flanges, a U-shaped connector extending through said flanges with the portion thereof adjacent its closed end slidably arranged through one of the same and its opposite end rigidly secured to the opposite end portion of the ring adjacent the other flange, a tongue carried by the ring overlying the said flanges and connector provided with keeper openings therethrough, a block arranged within the said connector upon one end portion of the said ring and having a hook portion adapted for reception within one of said openings when the device is in its locked position, and a tightening cam for the securing means operably arranged between the closed end of said connector and the adjacent face of said block.

2. A tire securing means comprising a split ring having outwardly projecting terminal flanges, a hook block secured to the outer side of one end portion of the said ring contiguous the flange thereof, a tongue secured to the other end portion of the said ring adjacent its flange overlying the said block and both end flanges of the ring and having receiving openings therethrough for the said hook and drawing connections for the adjacent ends of the said ring extending through said flanges coöperating with said block and operable inwardly of the said ring.

3. A tire securing means comprising a split ring having an angular terminal flange at one end thereof, a hook block adjacent said end of the ring secured to the outer face thereof in contact with the said flange, a tongue secured to the other end of the said ring overlying the said block and both ends of the ring and having receiving openings therethrough for the hook of said block and drawing connections for the adjacent ends of the said ring operable inwardly of the said ring.

4. A tire shoe securing means comprising in combination with a rim having a shoe positioned thereon, a ring within the shoe having spaced flanged ends, a connector for the said ends extending through the said flanges thereof and having a transverse terminal piece, a hook block within the said connector secured to the adjacent end of the ring and the flange thereof, a perforated locking tongue for the hook of the said block secured adjacent the other end of the ring, a tubular shaft freely extending through the said ring, and a cam head upon the said shaft operably contactingly arranged between the said block and terminal piece of the connector whereby upon rotation of the shaft the ring ends are adapted for inward movement.

5. A locking means comprising in combination with a rim having a shoe mounted thereon, a split ring within the shoe having a slot adjacent one end, a turn shaft radially extending through the said slot, a cam head upon the said shaft flatly engaging the said ring, a block upon the said ring at one side of the said head and in the path of movement of the latter, parallel flanges upon the opposite ends of said ring, a connector for the said ring ends extending through the said flanges having a transverse terminal portion normally arranged within the path of movement of the said cam, and a perforated locking tongue for the said block secured to the end portion of the ring opposite the slotted end thereof, the said shaft having a central bore therethrough adapted for the releasing reception of an instrument adapted for engaging the said tongue.

In testimony whereof I affix my signature in the presence of a witness.

BERTEL B. BROSVIK.

Witness:
BENNETT S. JONES.

Copies of this patent may be obtained for five cents each, by addressing the "Commissioner of Patents, Washington, D. C."